Patented Feb. 7, 1928.

1,658,213

UNITED STATES PATENT OFFICE.

OTTO C. STRECKER, OF DARMSTADT, GERMANY.

PROCESS FOR THE PRODUCTION OF CELLULOSE BY DECOMPOSITION OF VEGETABLE FIBERS.

No Drawing. Application filed September 21, 1925, Serial No. 57,755, and in Germany September 30, 1924.

In order to obtain cellulose from vegetable fibers as is well-known, it is usual to decompose them by means of alkaline or acid liquids for the active constituents of which a large series of different materials have been used or proposed for use.

According to the present invention I use for this purpose decomposing liquids which contain one or more soluble oxy-compounds of the isocyclic series in which one hydrogen atom has been replaced by a metal. A plurality of these hydrogen atoms may be replaced by metal; and a plurality of these hydrogen atoms may be replaced by metal and by a non-metal. As such non-metals, chlorine, bromine, iodine, nitrogen dioxide or nitro-groups are suitable.

As metals, preferably the alkali and alkaline earth metals as well as the metals of the magnesium group can be used. The following materials can be used for example as oxy-compounds of the isocyclic series, the international so-called Geneva terms being added in brackets:

(1) Phenols, for example phenol (oxybenzol $C_6H_6O$) or cresol (oxytoluol $C_7H_8O$);

(2) Alcohol-phenols for example phenolalcohol (oxybenzylalcohol or dioxymethylbenzol $C_7H_9O_2$);

(3) Phenol-acids for example metaoxybenzoic acid ($C_7H_6O_3$);

(4) Cyclohexahol (tetrahydrophenol $C_6H_{10}O$);

(5) Hydrated phenols, for example cyclohexanol (hexahydrophenol $C_6H_{12}O$);

(6) Naphthols, for example naphthol (oxynaphthalin $C_{10}H_8O$);

(7) Hydrated naphthols, for example oxynaphthalintetrahydride $C_6H_{12}O$ or oxynaphthalindecahydride $C_6H_{18}O$;

(8) Methylcyclohexanol (hexahydrooxytoluol $C_7H_{14}O$);

(9) Polyoxides, for example resorcin (dioxydbenzol $C_6H_6O_2$);

(10) Oxysulphones $C_{12}H_{10}O_2$—$SO_2$;

(11) Mono- and polycarbo-acids or sulfoacids $C_6H_6$—$SO_3$—O or their basic and neutral salts.

Further the homologues of the above indicated materials can be used. The position of the atoms in the constitution of these materials is immaterial. For example, the ortho-, meta- and para-cresols can be used equally well, singly or mixed.

The metals combine with the oxy-compounds to form salt-like alkaline reacting compounds which are known, for example, as phenolates and phenolalcoholates.

It is permissible to use the bases in excess.

For the decomposition the compounds are used in the form of solutions or permanent, i. e. not separating, emulsions. If the compounds used are soluble in water or other solvents such as in soap, or in hydrocyclanols and their homologues, the preparation of solutions gives no difficulties. The production of permanent emulsions also is simple, if to the solution of the one constituent can be added the other constituent without causing flocculent precipitation. If the production of solutions or permanent emulsions gives rise to difficulties this can be overcome by the addition of certain auxiliary materials, for example castor oil soap or cyclohexanol, which hold the material in question in solution or emulsion. Under the different additions which can be used according to requirements those can be selected which increase, diminish or do not affect at all the decomposing action of the liquid on the vegetable fibers.

For the more rapid penetration of the vegetable fibers further additions can be used. The following examples may be mentioned; alkaline, neutral or acid salts, weak acids with neutral or acid reaction, metallic bases, aliphatic or aromatic alcohols, phenol alcohols, together with their homologues and functional derivatives. Also catalysts can be used for which barium hydrate and barium superoxide may be mentioned as examples.

The concentration of the decomposing liquids made up according to the previous data may be small, in general about 2 to 20 parts by weight per cent suffice. The temperatures which should be maintained during the decomposition need not be high, and it is possible to work without increase of temperature. Accordingly no excess pressure at all or only a slight excess pressure is necessary so that the decomposition can take place in open vessels or thin-walled kettles. The time of treatment depends upon the vegetable fibers to be decomposed, the strength of the decomposing liquid, the movement, if any, in the vessels of the material to be decomposed, the temperature employed, and the pressure.

Several examples will now be indicated for making up the decomposing liquids, according to the invention, all of which examples refer to 100 litres of water. The quantities of the individual constituents vary according to the material at the time on hand, and are not in any case to be considered as unalterably prescribed.

*Example 1.*—For straw, a solution of altogether about 2 kgs. cresol, recinoleic acid and methylcyclohexanol in which 1 kg. sodium hydrate is partly chemically combined and partly dissolved. Heating is not necessary but rolling round of the mass should be carried out.

*Example 2.*—For wood (for example poplar and pine), about 4.5 kgs. of commercial potassium hydrate and 8 kgs. cresol and as addition 10 kgs. castor oil soap. Heating to 120° in enclosed vessels.

*Example 3.*—For straw or wood, about 5 kgs. of a basic salt of cresol-monosulpho acid, adding 5 kgs. castor oil soap and 5 kgs. cyclohexanol. Heating to 125° in enclosed vessels.

*Example 4.*—For esparto grass, about 3.5 kgs. potassium hydrate, and 7 kgs. cresol; in some cases with an addition of castor oil soap. Heating to 80°–95° in an open vessel.

On account of the weak concentration, the low temperature and the slight pressure, the yields of cellulose obtained with the use of the decomposing liquids according to the invention are considerably more favourable than those obtained with decomposing liquids hitherto proposed or used. The former apparently do not destroy the cellulose itself at all whilst the latter always more or less attack it, which can be observed without difficulty under microscopic examination. For example, using the new decomposing liquids the inter-cellular proliferations of the cellular vessels are not eaten away.

Since for the decomposing process by means of the new liquids quite simple apparatus suffice, the possibility arises of carrying it out in districts which are not industrial and without skilled work-people. The chemicals used can be manufactured partly from living or dead vegetable products and partly frequently can be obtained from fresh specimens. The low concentration of the liquids also considerably reduces the manufacturing costs because it avoids process losses.

Finally the decomposing liquids according to the present invention have the specially valuable property that they do not attack the metals of the apparatus. It is therefore possible completely to dispense with the otherwise necessary special linings of the reaction vessels with their well-known disadvantages. That these vessels may be open or need only be subjected to low pressure has been already indicated.

The chemicals used can be recovered without any difficulties worthy of mention.

In order to accelerate the action, higher temperatures than those indicated above can also be employed. However, in that case, the danger may arise that the decomposing liquids resinify and thus lose their activity. That can be avoided by adding to the decomposing liquid a reducing agent of neutral or alkaline reaction. As such a reducing agent, I may employ any inorganic or organic compound which is suitable for preventing an oxidation of the oxy-compounds contained in the decomposing liquid. As examples may be mentioned: neutral salts of sulphurous acid, alcohols, glycerine, and their substitution products with alkali, sodium phenyl sulphite ($C_6H_5$—O—$SO_2$Na) their homologues and substitution products, tin and stannous oxide. The sulphurous acid, for example, does not take part as a whole in the reaction of the boiling process. The derivatives of sulphur can be almost completely separated as metallic salts. The formation of a sulpho-acid salt, as in the sulphite process, apparently does not take place.

The process of decomposition by means of the new liquids is essentially the usual one. The plant fibers broken up to a sufficient extent are treated with the particular liquid at such temperature and under such pressure as may be necessary. At the same time a continuous and thorough mixing up of the liquid and the vegetable fibers is advantageous which can be done by stirring, rotating or agitating the vessel, circulating the liquid, etc. When the decomposition of the vegetable fibers is completed, the waste liquid is well decanted from the cellulose; it is rinsed with hot water, boiled and reduced to fibers in the well-known way.

The cellulose reduced to fibers is advantageously boiled out with alkali, weak soda solution is the best, for about two hours with vigorous boiling. In this way albuminates and vegetable gums are dissolved out of the fibers. Then the cellulose is well-washed out in the usual way and with the usual materials, bleached in bleaching hollanders and finally dried.

I claim:

1. The process for the production of cellulose by decomposition of vegetable fibers, which consists in treating said fibers with a decomposing solution containing a soluble oxy-compound of the isocyclic series, one of whose hydrogen atoms has been replaced by metal.

2. The process for the production of cellulose by decomposition of vegetable fibers, which consists in treating said fibers with a decomposing solution containing a soluble oxy-compound of the isocyclic series, a plurality of whose hydrogen atoms has been replaced by metal.

3. The process for the production of cellulose by decomposition of vegetable fibers, which consists in treating said fibers with a decomposing solution containing a soluble oxy-compound of the isocyclic series, a plurality of whose hydrogen atoms has been replaced by metal and by a non-metal.

4. The process for the production of cellulose by decomposition of vegetable fibers, which consists in treating said fibers with a decomposing solution containing a soluble oxy-compound of the isocyclic series, one of whose hydrogen atoms has been replaced by a metal of the alkali group.

5. The process for the production of cellulose by decomposition of vegetable fibers, which consists in treating said fibers with a decomposing solution containing a phenol, one of whose hydrogen atoms has been replaced by a metal.

6. The process for the production of cellulose by decomposition of vegetable fibers, which consists in treating said fibers with a decomposing solution containing a phenol, a plurality of whose hydrogen atoms has been replaced by a metal.

7. The process for the production of cellulose by decomposition of vegetable fibers, which consists in treating said fibers with a decomposing solution containing a phenol, a plurality of whose hydrogen atoms has been replaced by metal and by a non-metal.

8. The process for the production of cellulose by decomposition of vegetable fibers, which consists in treating said fibers with a decomposing solution containing a phenol, one of whose hydrogen atoms has been replaced by a metal of the alkali group.

9. The process for the production of cellulose by decomposition of vegetable fibers, which consists in treating said fibers with a decomposing solution containing a soluble oxy-compound of the isocyclic series, one of whose hydrogen atoms has been replaced by a metal, with the addition to said solution of an emulsifying agent.

10. The process for the production of cellulose by decomposition of vegetable fibers, which consists in treating said fibers with a decomposing solution containing a soluble oxy-compound of the isocyclic series, one of whose hydrogen atoms has been replaced by a metal, with the addition to said solution of castor oil soap.

11. The process for the production of cellulose by decomposition of vegetable fibers, which consists in treating said fibers with a decomposing solution containing a soluble oxy-compound of the isocyclic series, one of whose hydrogen atoms has been replaced by a metal, said solution further containing a catalyst.

12. The process for the production of cellulose by decomposition of vegetable fibers, which consists in treating said fibers with a decomposing solution containing a soluble oxy-compound of the isocyclic series, one of whose hydrogen atoms has been replaced by a metal, said solution further containing a catalytic barium compound.

13. The process for the production of cellulose by decomposition of vegetable fibers, which consists in treating said fibers with a decomposing solution containing a soluble oxy-compound of the isocyclic series, one of whose hydrogen atoms has been replaced by a metal, said solution further containing a reducing agent not having an acid reaction.

14. As a composition of matter, cellulose produced by the decomposition of vegetable fibers by means of a solution containing a soluble oxy-compound of the isocyclic series, one of whose hydrogen atoms has been replaced by a metal.

In testimony whereof I have affixed my signature.

OTTO C. STRECKER.